United States Patent [19]

Taylor

[11] Patent Number: 4,722,091

[45] Date of Patent: Jan. 26, 1988

[54] HYBRID LASER POWER SUPPLY

[75] Inventor: Stephen E. Taylor, Mercer County, N.J.

[73] Assignee: RCA Corporation, Princeton, N.J.

[21] Appl. No.: 832,223

[22] Filed: Feb. 24, 1986

[51] Int. Cl.$^4$ ............................................. H01S 3/097
[52] U.S. Cl. ...................................... 372/83; 372/38; 372/82
[58] Field of Search ...................... 372/38, 68, 83, 97, 372/18, 19, 55, 82, 81

[56] References Cited

U.S. PATENT DOCUMENTS

| | | | |
|---|---|---|---|
| 4,534,035 | 8/1985 | Long | 372/85 |
| 4,554,666 | 11/1985 | Altman | 372/19 |

OTHER PUBLICATIONS

V. Apollonov et al; "$CO_2$ Laser High–Voltage Power Supply Based on a Pulsed Transformer"; Instrum. & Exp. Tech. (USA); vol. 21, No. 6, pp. 1600–1604; Nov.-Dec. 1978.

Paul W. Pace et al., "A Frequency Stabilized Compact High Repetition Rate TEA-$CO_2$ Laser," *IEEE Journal of Quantum Electronics,* vol. QE-16, No. 9, Sep. 1980, pp. 937-944.

*Primary Examiner*—William L. Sikes
*Assistant Examiner*—Bertha Randolph
*Attorney, Agent, or Firm*—Clement A. Berard, Jr.; Robert L. Troike

[57] ABSTRACT

The present invention provides three embodiments of circuitry, responsive to the application of an energizing pulse to the high pressure tube of a hybrid laser, for de-energizing the normally continuously energized low-pressure tube of the hybrid laser for only a given time interval which is longer than the duration of the high-energy pulse of coherent wave energy generated by the high pressure tube when energized. This solves a prior-art problem of sporadic spike emissions by the low-pressure tube during the time interval in which echoes from objects of interest are being received by a LIDAR employing a hybrid laser transmitter portion.

11 Claims, 4 Drawing Figures

HYBRID LASER POWER SUPPLY

BACKGROUND OF THE INVENTION

I. Field Of The Invention

This invention relates to a power supply for use with a hybrid laser and, more particularly, to such a power supply for energizing a hybrid laser employed as the transmitting portion of a LIDAR (Laser Infra-red Detection And Ranging) system.

II. Description Of The Prior Art

As known in the prior art, hybrid lasers are employed to provide high energy pulses of coherent wave energy in a single longitudinal mode (and preferably a single transverse mode). Reference is made to U.S. Pat. No. 4,554,666, which issued Nov. 19, 1985. This patent discusses the state of the hybrid laser art in some detail.

Briefly, a hybrid laser is comprised of an optical resonant cavity in which is situated a narrow-bandwidth, low-energy active lasing medium (such as a continuously-excited low pressure $CO_2$ laser tube) and a wide-bandwidth, high-energy active lasing medium (such as a pulse-excited high-pressure TEA (i.e., transverse-excited atmospheric) $CO_2$ laser tube). The two laser tubes are arranged in serial relationship with one another within the optical resonant cavity, so that coherent light reflected from a first reflector at one end of the optical resonant cavity must travel through both laser tubes before reaching a second reflector at the other end of the optical resonant cavity. Consequently, the bandwidth of the high-energy coherent wave energy pulses (generated by the high-pressure laser tube) is constrained by the narrow-bandwidth of the low-energy, low-pressure laser tube.

LIDAR, which is similar to radar, employs coherent wave energy at infra-red wavelengths generated by a laser, rather than microwave coherent wave energy at radio wavelengths, to measure the distance to objects, the velocity of such objects by Doppler techniques, etc. As is known, LIDAR is often used for the purpose of making atmospheric measurments of various types.

A $CO_2$ hybrid laser is particularly suitable for use as the transmitter portion of a LIDAR. This is true because of the ability of a $CO_2$ hybrid laser to generate single longitudinal mode, high peak power short pulses of infra-red wave energy. The high peak power extends the ranging distance of a LIDAR. The small length of each pulse increases the resolution in range with which objects at slightly different distances may be distinguished, and the single longitudinal mode of the pulse coherent wave energy makes it possible to measure relatively small object velocities with high precision by Doppler techniques. By way of example, it would be desirable to employ a LIDAR comprised of a hybrid $CO_2$ laser transmitter in a polar-orbit weather satellite for the purpose of making accurate measurements of wind velocity at closely spaced points (every few kilometers) over the face of the earth. Such measured wind velocity data could then be used, along with other weather data, to provide (by computer analysis of the measured data) much more accurate long-term, worldwide weather forecasting than is currently achievable.

An essential requirement of both radar and LIDAR is that no power be radiated by the transmitter during the entire time interval following the transmission of each exploratory pulse during which reflected echoes from objects of interest may be received by the radar or LIDAR. Otherwise, the relatively low-power echo wave energy would be swamped by such undesired transmitter power leaking into the receiver system.

In the past, the low pressure laser tube of the $CO_2$ hybrid laser transmitting portion of a LIDAR was continuously excited. Therefore, the hybrid laser would normally emit a certain amount of low-power infra-red light, deriving from the low pressure tube laser during the period between successive high-power pulses of infra-red light deriving from the high pressure laser tube. However, in practice, the creation of each high power laser pulse (generated in response to an applied excitation pulse to the high pressure laser tube) results immediately thereafter in the Q of the cavity being spoiled due to optical and thermal effects. This spoiling of the Q of the cavity squelches lasing of both the low and high pressure laser tubes, although the low pressure laser tube continues to be energized and excited (i.e., the plasma current continues to flow therein). It is fortunate that the lasing of the low pressure tube of the hybrid laser of the transmitting portion of a LIDAR takes place, since the production of laser light from the low pressure tube would inevitably be detected in the receiver optics and possibly swamp any received signal.

The problem in the prior art is that after a time interval of roughly 100 microseconds ($\mu s$)—highly dependent on laser design—the low pressure tube of the hybrid laser begins to sporadically emit low-power spikes of infra-red light for a certain time before the spoiled Q of the cavity recovers and the low pressure tube resumes continuous lasing. While the total time of the spoiled Q of the cavity to recover is sufficient for object echoes of interest to be received by the receiving portion of the LIDAR, the time interval of only 100 $\mu s$ is substantially shorter than that which is required to receive the more distant object echoes of interest. Therefore, the problem with the prior art is that the receiving portion of the LIDAR is disrupted by the detection of the sporadic infra-red spikes. The present invention is directed to a solution to this problem.

SUMMARY OF THE INVENTION

In accordance with the present invention, the continuous excitation of the low pressure laser tube of the hybrid laser is automatically disrupted in synchronization with the firing of the high pressure laser tube for a given predetermined time from the instant of the main discharge of the high pressure laser tube.

More specifically, the present invention is directed to an improvement in the power supply used for energizing the respective low-pressure and high-pressure laser tubes of a hybrid laser. As in the prior art, such a power supply includes (1) first means for intermittently applying an energizing pulse to the high-pressure laser tube thereby permitting the high-pressure laser tube to generate a high-energy pulse of coherent wave energy of a certain duration at the beginning of such an applied energizing pulse, and (2) second means for normally continuously energizing the low-pressure laser tube, thereby permitting the low-pressure laser tube to normally continuously generate low-energy coherent wave energy. However, in accordance with the improvement of the present invention, the second means includes third means coupled to the first means and responsive to the application of an energizing pulse to the high pressure laser tube for de-energizing the low-pressure laser tube for only a given time interval from the beginning of the energizing pulse, the given time interval being longer than the certain duration of the high energy pulse. The effect is that the low-pressure laser tube generates no coherent wave energy during the given time interval.

PREFERRED EMBODIMENTS OF THE INVENTION

Figure 1:
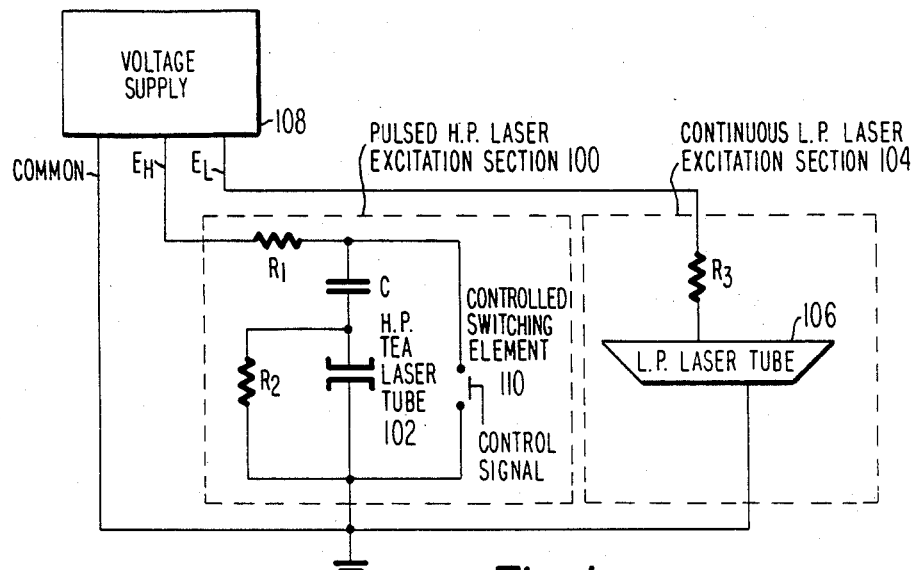
FIG. 1 is a schematic diagram illustrating a conventional prior art hybrid laser power supply for energizing the low and high pressure laser tubes thereof.

Referring to FIG. 1, the prior art power supply includes pulsed high-pressure (H.P.) laser excitation section 100, for energizing the high-pressure (H.P.) TEA laser tube 102 (which preferably employs $CO_2$ as its active lasing medium), and continuous low-pressure (L.P.) laser excitation section 104, for energizing L.P. laser tube 106 (which also preferably includes $CO_2$ as its active lasing medium).

FIG. 1 shows a single voltage supply 108 having respective "common," $E_H$, and $E_L$ terminals. The "common" terminal may be grounded, as indicated in FIG. 1.

Voltage supply 108 is a relatively high voltage supply that provides respective first and second D.C. voltages on terminals $E_H$ and $E_L$ of given polarity with respect to the grounded common terminal of voltage supply 108. The first voltage on terminal $E_H$, which is used to energize pulsed H.P. laser excitation section 100, has a magnitude that is substantially higher than the magnitude of the second voltage on terminal $E_L$, which is used to energize the continuous L.P. laser excitation section 104. By way of example, the magnitude of the first voltage on terminal $E_H$ may be of a magnitude of about 40 kilovolts, while the second voltage on terminal $E_L$ may have a magnitude of about 9 kilovolts.

Pulsed H.P. laser excitation section 100 is comprised of capacitance C, a charging circuit for capacitance C and a discharging circuit for capacitance C. The charging circuit for capacitance C includes resistance $R_1$ connecting one end of capacitance C to terminal $E_H$ of voltage supply 108 and resistance $R_2$ connecting the other end of capacitance C to the grounded common terminal of voltage supply 108.

Capacitance C, which must store sufficient energy to provide a high power excitation pulse to H.P. laser tube 102 on discharge, has a relatively high value, such as 30 to 40 nanofarads. The time constant for the charging circuit for capacitance C may be as short as a few milliseconds or as long as one-half second. A short time constant permits a high pulse repetition for H.P. laser tube 102, but requires a higher charging current from voltage supply 108. Depending on the time constant, $R_1$ has a value that ranges from somewhat below 0.1 megohm to somewhat above 10 megohms. $R_2$ has a much lower value in the order of tens of ohms.

A discharging circuit for C includes normally-open switching element 110, which, when closed, connects the aforesaid one end of capacitance C directly to the grounded common terminal of voltage supply 108, and the H.P. laser tube 102 connecting the aforesaid other end of capacitance C to the grounded common terminal of voltage supply 108. Switching element 110 may be comprised of a normally-open controlled switch, such as a thyratron or a triggered spark gap, which is closed only when a control trigger signal is applied to a control electrode thereof.

As long as normally-open switching element 110 remains open, no energizing current can flow through H.P. laser tube 102. This permits capacitance C to be charged relatively slowly through resistances $R_1$ and $R_2$ toward the high voltage (e.g., 40 kilovolts) on terminal $E_H$. After a time interval that is at least sufficient for capacitance C to become fully charged, a control trigger signal is applied to the control electrode of normally open switching element 110, thereby closing switching element 110. This provides pulsed H.P. laser tube 102 with an energizing pulse, as capacitance C discharges very quickly through closed switching element 110 and H.P. laser tube 102. Further, as soon as capacitance C is discharged, switching element 110 reopens, and charging of capacitance C begins all over again. This process continues periodically (or at least intermittently) to provide a series of spaced pulses of coherent wave energy from laser tube 102.

As shown in FIG. 1, the continuous L.P. laser excitation section 104 is comprised of resistance $R_3$, having one end thereof connected to terminal $E_L$ of voltage supply 108 and the other end thereof connected L.P. laser tube 106. Laser tube 106 is serially connected between the other end of resistance $R_3$ and the grounded common terminal of voltage supply 108. Resistance $R_3$, which operates as a current-limiting resistance, may have a value of nearly 0.9 megohms to permit L.P. laser tube 106 to be continuously energized by a current of about 10 milliamperes produced by a voltage of about 9 kilovolts at the $E_L$ terminal of voltage supply 108.

It is to be noted that in FIG. 1, the energization of pulsed H.P. laser excitation section 100 is completely independent from the energization of continuous L.P. laser excitation section 104. Therefore, the single voltage supply 108 shown in FIG. 1 may be (and in practice often is) replaced by two separate voltage supplies—one of which supplies the voltage at the $E_H$ terminal of voltage supply 108 to pulsed H.P. laser excitation section 100 and the other of which supplies the voltage at the $E_L$ terminal of voltage supply 108 of the continuous L.P. laser excitation section 104. In this latter case each of the two voltage supplies would have its own individual common terminal (which may or may not be grounded).

Figure 2:
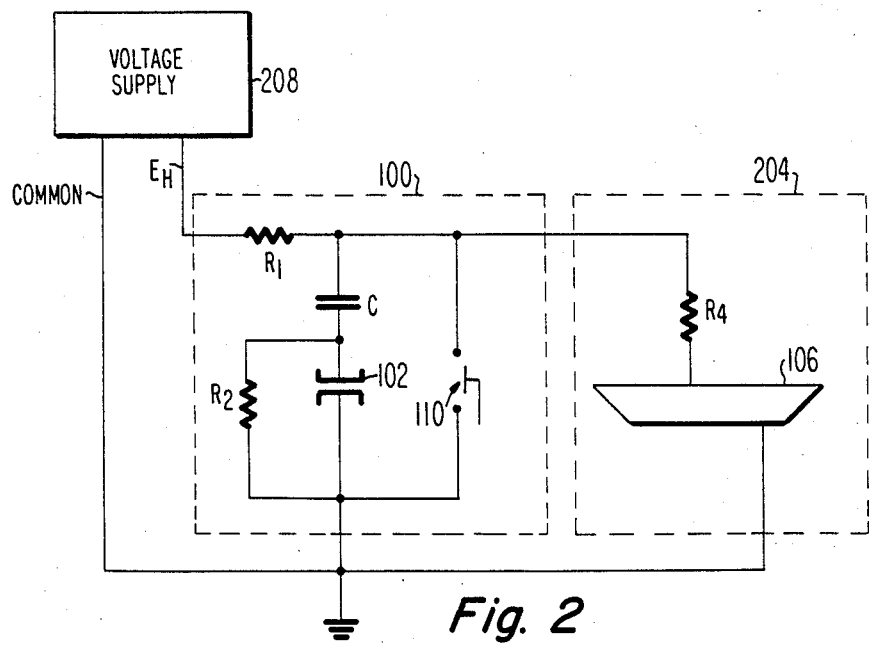
FIG. 2 is a schematic diagram showing the power supply of FIG. 1 modified in accordance with a first embodiment of the present invention.
Figure 3:
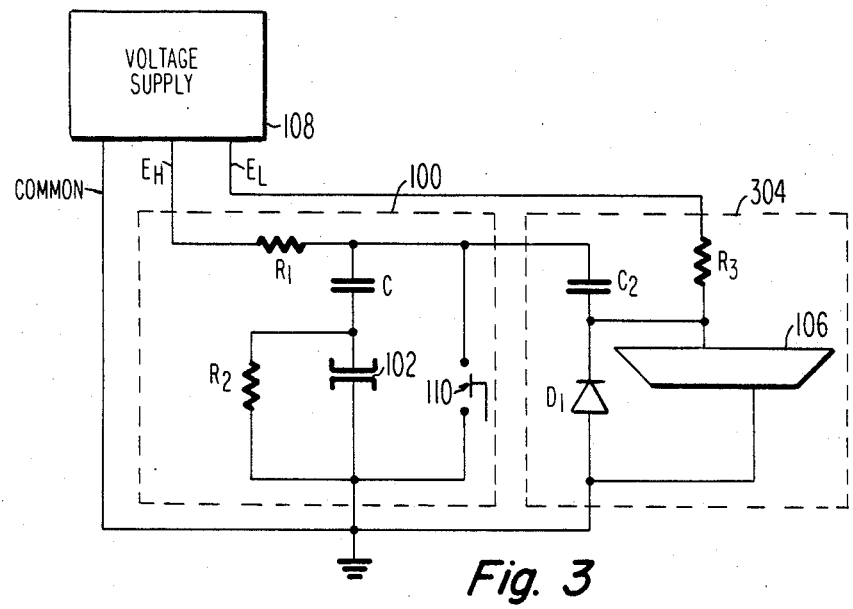
FIG. 3 is a schematic diagram showing the power supply of FIG. 1 modified in accordance with a second embodiment of the present invention.
Figure 4:
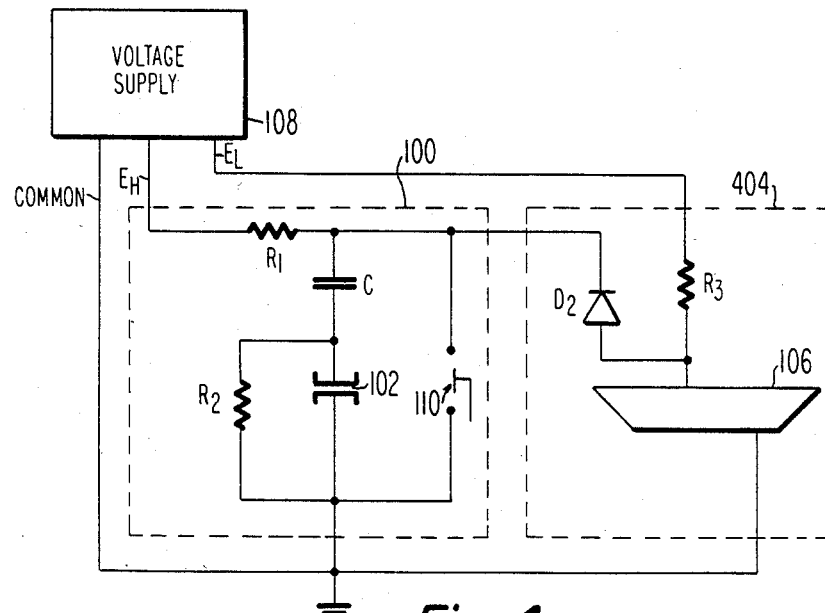
FIG. 4 is a schematic diagram showing the power supply of FIG. 1 modified in accordance with a third embodiment of the present invention.

FIGS. 2, 3 and 4, each of which illustrates a different embodiment of the present invention, all provide means responsive to the application of an energizing pulse to H.P. TEA laser tube 102 for de-energizing L.P. laser tube 106 for a time interval more than sufficient for all LIDAR echoes of interest to be received. However, the implementation shown in the FIG. 2 embodiment of the present invention is significantly less desirable than the respective implementations shown in the FIGS. 3 and 4 embodiments of the present invention.

Referring to FIG. 2, voltage supply 208 includes only an $E_H$ terminal and a grounded common terminal. The relatively high magnitude voltage (e.g. 40 kilovolts) at terminal $E_H$ of voltage supply 208 with respect to ground is used to energize both pulsed H.P. laser excitation section 100 and continuous L.P. laser excitation section 204, as shown in FIG. 2. Specifically, current-limiting resistance $R_4$ of L.P. laser excitation section 204 has one end thereof connected to the junction of resistance $R_1$ and capacitance C of H.P. laser excitation section 100, with the other end of current-limiting resistance of $R_4$ being connected to one end of L.P. laser tube 106. This differs from the prior art shown in FIG. 1, wherein the current-limiting resistance $R_3$ is connected between terminal $E_L$ of voltage supply 108 and one end of L.P. laser tube 106. In other respects, the structure of the FIG. 2 embodiment of the present invention is similar to that of the prior art shown in FIG. 1.

If the current flow through L.P. laser tube 106, of the FIG. 2 embodiment (after capacitance C is fully charged) is about 10 milliamperes and the magnitude of the voltage at terminal $E_H$ of the voltage supply 208 is 40 kilovolts, the sum of the resistance values of $R_1$ and $R_4$ has to be nearly 4 megohms. However, the maximum voltage charge across capacitance C at the time that switching element 110 is triggered is equal to the difference between the 40 kilovolts at terminal $E_H$ of voltage supply 208 and the voltage drop across resistance $R_1$ caused by the 10 milliampere current for L.P. laser tube 106 flowing through resistance $R_1$. In order not to unduly lower the voltage charge of capacitance C (which would lower the power of the excitation pulse of H.P. laser tube 102 and the power of the coherent wave pulse generated thereby), the resistance value of $R_1$ must be relatively small (e.g., 0.1 megohms). One result of this is that the charging circuit for C in the FIG. 2 embodiment is always quite short (a few milliseconds), regardless of whether the pulse repetition rate of the LIDAR is low or high. A more important result of the relatively small resistance value for $R_1$ in the FIG. 2 embodiment is that the resistance value of current-limiting resistance $R_4$ is relatively large (e.g., nearly 3.9 megohms). The 10 milliampere current flowing through a current-limiting resistance $R_4$ value of nearly 3.9 megohms dissipates nearly 390 watts. This wasted power of nearly 390 watts of the FIG. 2 embodiment of the present invention is much greater than the wasted power of only nearly 90 watts of the FIG. 1 prior art (i.e., the power dissipation resulting from ten milliamperes flowing through the nearly 0.9 megohm current-limiting resistance $R_3$). This large amount of wasted power, which requires that power supply 208 be much larger than power supply 108, is a big disadvantage of the implementation of the FIG. 2 embodiment of the present invention.

Nevertheless, the FIG. 2 embodiment of the present invention does serve to de-energize continuous L.P. laser tube 106 for a time interval at least sufficient for all LIDAR echoes of interest to be received (and thereby solve the above-discussed problem with the prior art, wherein the receiving portion of the LIDAR is disrupted by the detection of sporadic infra-red spikes). Specifically, the closing of normally-controlled switching element 110 in the FIG. 2 embodiment (as in the prior art shown in FIG. 1) results in capacitance C quickly discharging through H.P. laser tube 102,—thereby energizing H.P. laser tube 102 with an energizing pulse—after which, switching element 110 reopens and capacitance C recharges. However, in the FIG. 2 embodiment, the closing of normally-open and controlled switching element 110 also results in shorting out L.P. laser excitation section 204, thereby de-energizing and extinguishing the plasma in L.P. laser tube 106. Even after control switching element 110 reopens, L.P. laser tube 106 of the FIG. 2 embodiment remains de-energized until capacitance C recharges to the relatively high striking voltage of L.P. laser tube 106. Furthermore, even after L.P. laser tube 106 has been struck, the current therethrough will not reach its operating level of 10 milliamperes until capacitance C is substantially fully charged (i.e., a time interval of a few milliseconds following the generation of the immediately preceding excitation pulse).

The respective embodiments of the present invention shown in FIGS. 3 and 4 employ all the structure employed by the prior art shown in FIG. 1, as well as additional structure not employed by the prior art. This structure common to the embodiments of the present invention shown in FIGS. 3 and 4 and the prior art shown in FIG. 1 functions in the same manner as that described above in connection with FIG. 1.

Specifically, LP laser excitation section 304 of the FIG. 3 embodiment of the present invention further includes additional structure, not employed by the prior art shown in FIG. 1, for de-energizing L.P. laser tube 106 for a time interval sufficiently long for all LIDAR echoes of interest to be received following the energization of H.P. laser tube 102 by an excitation pulse, before L.P. laser tube 106 is re-energized. This additional structure is comprised of capacitance $C_2$ having one end thereof connected to the junction of resistance $R_1$ and capacitance C and the other end thereof connected to the junction of current-limiting resistance $R_3$ and one end of L.P. laser tube 106. This additional structure further includes a diode $D_1$, shunting L.P. laser tube 106, poled as shown in FIG. 3 for a positive supply or reverse poled for a negative supply.

In FIG. 3, it is assumed that the respective voltages of both the $E_H$ and $E_L$ terminals of voltage supply 108 have a positive polarity with respect to the grounded common terminal. First assume that capacitance C has been fully charged, normally-open controlled switching element 110 remains open and that LP laser tube 106 is being continuously energized by about 10 milliamperes of current flowing from terminal $E_L$ through current-limiting $R_3$. In this case, the top plate of capacitance $C_2$ will be charged to the same positive potential as capacitance C (40 kilovolts), while the bottom plate of capacitance $C_2$ will be at a positive potential of only a few hundred volts (caused by the voltage drop across L.P. laser tube 106 when it is conducting) because diode $D_1$, poled as shown, is reversed bias. Now assume that switching element 110 is closed, resulting in the discharge of capacitance C and the application of an excitation pulse to H.P. laser tube 102. The effect of this on L.P. laser excitation section 304 is to ground the top side of capacitance $C_2$, thereby tending to drop the bottom plate of capacitance $C_2$ to a negative potential of nearly 40 kilovolts. However, diode $D_1$, poled as shown in FIG. 3, becomes forward biased and clamps the bottom plate of capacitance $C_2$ to ground. The result is that there is no voltage across L.P. laser tube 106, thereby de-energizing L.P. laser tube 106.

After switching element 110 reopens, L.P. laser tube 106 remains de-energized until the bottom plate of capacitance $C_2$ reaches a positive potential sufficient to strike L.P. laser tube 106 into conduction (the length of time being dependent on both the charging time constant of capacitance C through resistance $R_1$ and also, to a certain extent, on such factors as (1) the time constant of capacitance $C_2$ through resistances $R_1$, $R_3$ and voltage supply 108, and (2) the magnitudes of the voltages at terminals $E_H$ and $E_L$ of voltage supply 108. In any case, the time interval between the closing of switching element 110 and the striking of the L.P. laser tube 106 is at least a few milliseconds (i.e., more than enough time for all LIDAR echoes of interest to be received before energization and lasing of L.P. laser tube 106 resumes).

In the FIG. 4 embodiment, the only additional structure of L.P. laser excitation section 404 of the FIG. 4 embodiment, that is not also employed in the prior art shown in FIG. 1, is diode $D_2$, poled as shown, (again for a positive supply), which is connected between the junction of resistance $R_1$ and capacitance C and the junction of current-limiting resistance $R_3$ and L.P. laser tube 106.

It is assumed in FIG. 4 that the respective voltages on terminals $E_H$ and $E_L$ of voltage supply 108 have a positive polarity with respect to the grounded common terminal. In this case, the diode $D_2$, poled as shown, will be reversed biased by the positive voltage charge on capacitance C prior to the closing of switching element 110, while L.P. laser tube 106 remains energized and continuously lasing. However, the closing of switching element 110 results in the grounding of the top plate of capacitance C, thereby forward biasing diode $D_2$ and clamping the junction of current-limiting resistance $R_3$ and L.P. laser tube 106 to ground. Therefore, L.P. laser tube 106 becomes de-energized. Even after switching element 110 reopens, L.P. laser tube 106 will remain de-energized until diode D is again reverse biased by capacitance C recharging to a positive potential having a magnitude equal to the striking voltage of L.P. laser tube 106. After the resumption of conduction by L.P. laser tube 106, in response to the striking thereof, there is a large voltage drop across current-limiting resistance $R_3$, which results in the diode $D_2$ again being reversed biased. However, in all cases, the time constant for charging C is sufficiently long so that L.P. laser tube 106 is not re-energized and does not resume lasing until a time interval has elapsed following the generation of an excitation pulse applied to H.P. laser tube 102 that is sufficiently long for all LIDAR echoes of interest to be received (e.g., at least a few milliseconds).

It has been assumed in describing the FIGS. 3 and 4 embodiments of the present invention that voltage supply 108 provides positive polarity voltages at terminals $E_H$ and $E_L$ with respect to the grounded common terminal. However, this is not a requirement of the present invention. Should voltage supply 108 provide negative polarity voltages at terminals $E_H$ and $E_L$ thereof, the respective FIGS. 3 and 4 embodiments will operate in a similar manner to that described above if the poling of the diode $D_1$ in FIG. 3 is reversed and the poling of the diode $D_2$ in FIG. 4 is reversed.

It has been verified, in practice, that the low pressure laser tube of a hybrid laser can be switched off for periods of many milliseconds, reliably and in synchronization with the discharge of the high pressure TEA laser tube. Thus, in spaceborne applications, as a result of the long time of flight of the laser pulse, the techniques disclosed herein should prove especially useful for any type of hybrid gas laser remote sensing systems.

What is claimed is:

1. In a power supply for use in energizing the respective low-pressure and high-pressure laser tubes of a hybrid laser; wherein said power supply includes (1) first means for intermittently applying an energizing pulse to said high-pressure laser tube thereby permitting said high-pressure laser tube to generate a high-energy pulse of coherent wave energy of a certain duration in response thereto, and (2) second means for normally continuously energizing said low-pressure laser tube thereby permitting said low-pressure laser tube to normally continuously generate low-energy coherent wave energy; the improvement wherein:

said second means includes third means coupled to said first means and responsive to the application of an energizing pulse to said high pressure laser tube for de-energizing said low-pressure laser tube for only a given time interval from the beginning of said energizing pulse, said given time interval being longer than said certain duration of said high-energy pulse, whereby said low-pressure laser tube generates no coherent wave energy during said given time interval.

2. The power supply defined in claim 1, wherein said first means comprises a capacitance; a charging circuit coupled to said capacitance to charge said capacitance from a high voltage supply which includes a first resistance for connecting one end of said capacitance to a first terminal of said high voltage supply which provides a first given voltage of a given polarity with respect to a second terminal thereof, and a second resistance for connecting the other end of said capacitance to said second terminal; and a discharging circuit coupled to said one end of said capacitance and to said second terminal to discharge said capacitance through said high pressure laser tube which includes a normally-open switching element that directly connects said one end of said capacitance to said second terminal in response to said switching element being closed for at least said certain duration, said high pressure laser tube being connected between said other end of said capacitance and said second terminal; and wherein:

said third means couples said low pressure laser tube between said one end of said capacitance and said second terminal.

3. The power supply defined in claim 2, wherein:

said third means includes a third resistance having one end thereof connected to said one end of said capacitance, said low pressure laser tube being serially connected between the other end of said third resistance and said second terminal.

4. The power supply defined in claim 2, wherein said second means includes a third resistance having one end thereof connected to a third terminal of said high voltage supply which provides a second given voltage of said given polarity with respect to said second terminal that is smaller than said first given voltage, said low pressure laser tube, being serially connected between the other end of said third resistance and said second terminal; and wherein:

said third means comprises a second capacitance connected between said one end of said first-mentioned capacitance and said other end of said third resistance, and a diode connected between said other end of said third resistance and said second terminal of said high voltage supply, said diode being poled to be back biased by a voltage of said given polarity.

5. The power supply defined in claim 2, wherein said second means includes a third resistance having one end thereof connected to a third terminal of said high voltage supply which provides a second given voltage of said given polarity with respect to said second terminal that is smaller than said first given voltage, said low pressure laser tube being serially connected between the other end of said third resistance and said second terminal; and wherein:

said third means comprises a diode connected between said one end of said capacitance and said other end of said third resistance, said diode being poled to be back biased whenever the voltage of said given polarity with respect to said second terminal at said one end of said capacitance exceeds the voltage of said given polarity with respect to said second terminal at said other end of said third resistance.

6. A hybrid laser comprising a low-pressure tube, a high-pressure tube and a power supply for energizing said low-pressure tube and said high-pressure tube; wherein said power supply includes (1) first means for intermittently applying an energizing pulse to said high-pressure laser tube thereby permitting said high-pressure laser tube to generate a high-energy pulse of coherent wave energy of a certain duration at the beginning of such an applied energizing pulse, and (2) second means for normally continuously energizing said low-pressure laser tube thereby permitting said low-pressure laser tube to normally continuously generate low-energy coherent wave energy; the improvement wherein:

said second means includes third means coupled to said first means and responsive to the application of an energizing pulse to said high pressure laser tube for de-energizing said low-pressure laser tube for only a given time interval from the beginning of said energizing pulse, said given time interval being longer than said certain duration of said high-energy pulse, whereby said low-pressure laser tube generates no coherent wave energy during said given time interval.

7. The hybrid laser defined in claim 6, wherein said first means comprises a capacitance; a charging circuit coupled to said capacitance to charge said capacitance from a high voltage supply which includes a first resistance for connecting one end of said capacitance to a first terminal of said high voltage supply which provides a first given voltage of a given polarity with respect to a second terminal thereof, and a second resistance for connecting the other end of said capacitance to said second terminal; and a discharging circuit coupled to said one end of said capacitance and to said second terminal to discharge said capacitance through said high pressure laser tube which includes a normally-open switching element that directly connects said one end of said capacitance to said second terminal in response to said switching element being closed for at least said certain duration, said high pressure laser tube being connected between said other end of said capacitance and said second terminal; and wherein:

said third means couples said low pressure laser tube between said one end of said capacitance and said second terminal.

8. The hybrid laser defined in claim 7, wherein: said third means includes a third resistance having one end thereof connected to said one end of said capacitance, said low pressure laser tube being serially connected between the other end of said third resistance and said second terminal.

9. The hybrid laser defined in claim 7, wherein said second means includes a third resistance having one end thereof connected to a third terminal of said high voltage supply which provides a second given voltage of said given polarity with respect to said second terminal that is smaller than said first given voltage, said low pressure laser tube being serially connected between the other end of said third resistance and said second terminal; and wherein:

said third means comprises a second capacitance connected between said one end of said first-mentioned capacitance and said other end of said third resistance, and a diode connected between said other end of said third resistance and said second terminal of said high voltage supply, said diode being poled to be back biased by a voltage of said given polarity.

10. The hybrid laser defined in claim 7, wherein said second means includes a third resistance having one end thereof connected to a third terminal of said high voltage supply which provides a second given voltage of said given polarity with respect to said second terminal that is smaller than said first given voltage, said low pressure laser tube being serially connected between the other end of said third resistance and said second terminal; and wherein:

said third means comprises a diode connected between said one end of said capacitance and said other end of said third resistance, said diode being poled to be back biased whenever the voltage of said given polarity with respect to said second terminal at said one end of said capacitance exceeds the voltage of said given polarity with respect to said second terminal at said other end of said third resistance.

11. The hybrid laser defined in claim 6, wherein:
said low-pressure laser tube is a low-pressure $CO_2$ laser tube, and said high-pressure laser tube is a TEA $CO_2$ laser tube.

* * * * *